(12) United States Patent
Chien et al.

(10) Patent No.: US 10,013,894 B2
(45) Date of Patent: Jul. 3, 2018

(54) BICYCLE APPARATUSES FOR USE IN AUTOMOTIVE TESTING

(71) Applicants: Toyota Motor Engineering & Manufacturing North America, Inc., Erlanger, KY (US); Toyota Jidosha Kabushiki Kaisha, Toyota-shi, Aichi-ken (JP); Indiana University Research and Technology Corporation, Indianapolis, IN (US)

(72) Inventors: Stanley Yung-Ping Chien, Indianapolis, IN (US); Rini Sherony, Ann Arbor, MI (US); Hiroyuki Takahashi, Toyota (JP); Jason Brink, Brazil, IN (US); Qiang Yi, Indianapolis, IN (US)

(73) Assignees: Toyota Motor Engineering & Manufacturing North America, Inc., Plano, TX (US); Toyota Jidosha Kabushiki Kaisha, Toyota-shi (JP); Indiana University Research and Technology Corporation, Indianapolis, IN (US)

( * ) Notice: Subject to any disclaimer, the term of this patent is extended or adjusted under 35 U.S.C. 154(b) by 158 days.

(21) Appl. No.: 15/044,464

(22) Filed: Feb. 16, 2016

(65) Prior Publication Data

US 2016/0357180 A1    Dec. 8, 2016

Related U.S. Application Data

(60) Provisional application No. 62/170,411, filed on Jun. 3, 2015.

(51) Int. Cl.
G09B 23/10 (2006.01)
B25J 11/00 (2006.01)
G01M 17/007 (2006.01)

(52) U.S. Cl.
CPC ............... *G09B 23/10* (2013.01); *B25J 11/00* (2013.01); *G01M 17/0076* (2013.01)

(58) Field of Classification Search
CPC ........................... G09B 23/10; G01M 17/0078
(Continued)

(56) References Cited

U.S. PATENT DOCUMENTS 3,098,219 A    7/1963  Voigt et al.
3,683,098 A    8/1972  Abraham Chavez, Jr.
(Continued)

FOREIGN PATENT DOCUMENTS

DE    102011017146 A1    10/2012
DE    102013214936 A1    9/2014

*Primary Examiner* — Lisa Caputo
*Assistant Examiner* — Nathaniel T Woodward
(74) *Attorney, Agent, or Firm* — Dinsmore & Shohl LLP

(57) ABSTRACT

An apparatus for repetitive use in automotive testing includes a body. The body includes a torso and a pair of legs. Each leg includes an upper portion and a lower portion pivotably connected to each other. An upper drive pivotably drives the upper portion of each of the pair of legs about a first pivot point disposed on a bottom portion of the torso. A lower drive pivotably drives the upper portion with respect to a corresponding lower portion of the leg. The upper drive and lower drive working in concert to articulate the upper and lower portions of the leg to replicate a pedaling motion.

20 Claims, 6 Drawing Sheets

(58) Field of Classification Search
USPC .......................................................... 73/866.4
See application file for complete search history.

(56) References Cited

U.S. PATENT DOCUMENTS

| | | |
|---|---|---|
| 5,224,896 A | 7/1993 | Terzian |
| 7,328,087 B2 | 2/2008 | Saito et al. |
| 2005/0155441 A1* | 7/2005 | Nagata .............. G01M 17/0078 73/865.3 |
| 2005/0258199 A1* | 11/2005 | Honer .................... G09B 23/28 223/66 |
| 2014/0102224 A1* | 4/2014 | Fritz ...................... G09B 23/30 73/866.4 |

* cited by examiner

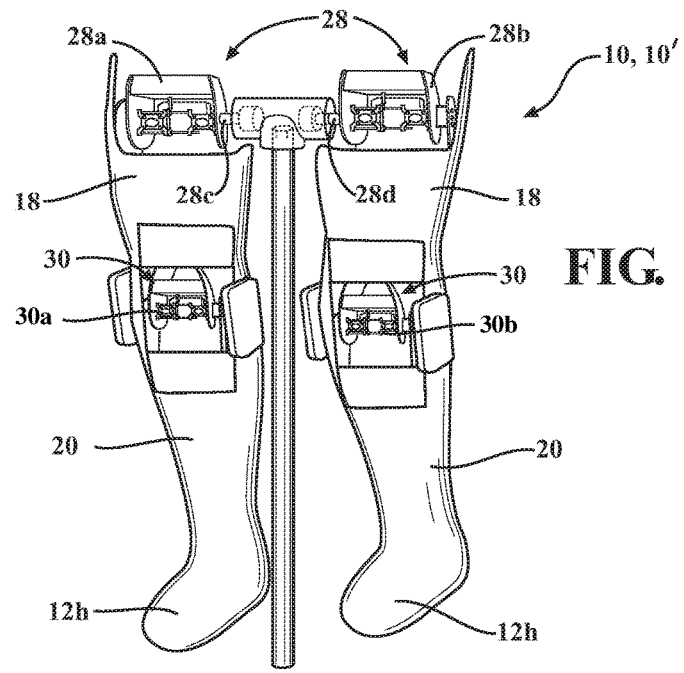
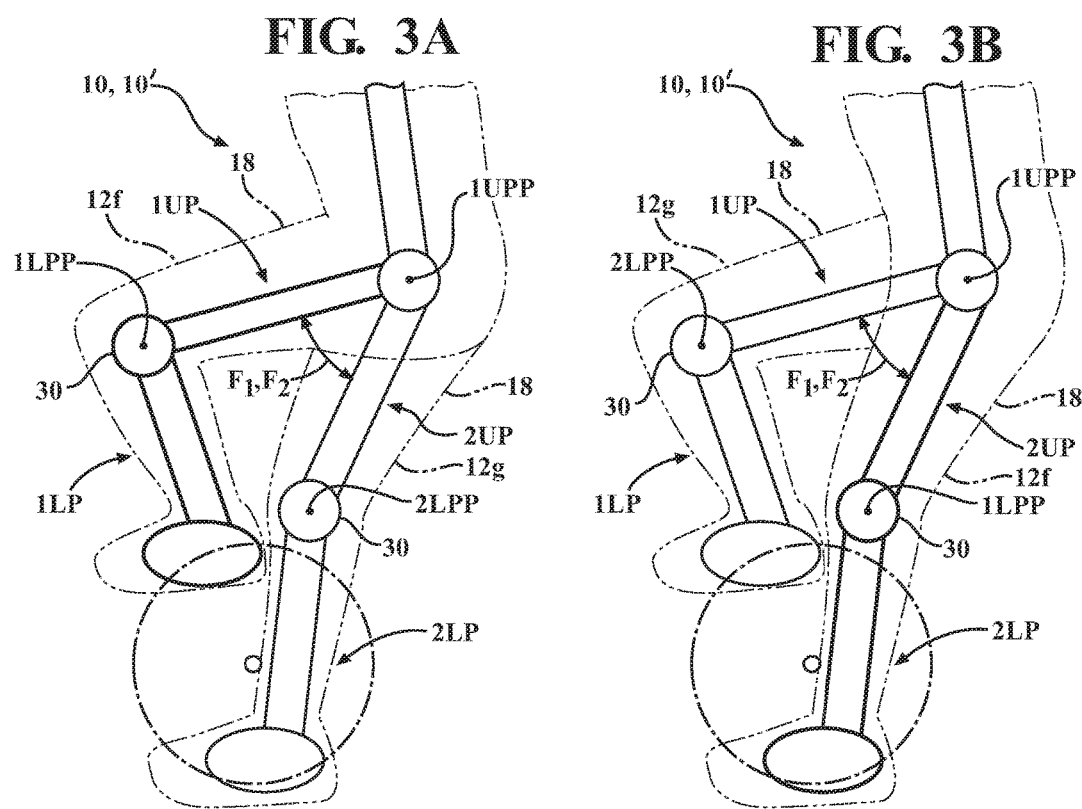

US 10,013,894 B2

BICYCLE APPARATUSES FOR USE IN AUTOMOTIVE TESTING

CROSS-REFERENCE TO RELATED APPLICATION(S)

This application claims the benefit of U.S. Provisional Patent Application No. 62/170,411, filed Jun. 3, 2015 and entitled "Surrogate Bicyclist Rider For Use In Automotive Testing," the entirety of which is incorporated by reference herein.

TECHNICAL FIELD

The present specification generally relates to an apparatus for repetitive use automotive testing and, more specifically, an apparatus configured to mimic the pedaling motion of human legs.

BACKGROUND

Automotive companies develop accurately active control systems ("Systems") such as an autonomous emergency braking system to avoid or mitigate vehicle collisions. In particular, the Systems may be designed to avoid or mitigate a collision with a bicyclist. Current Systems require the detection of a bicycle, and use sensors such as a camera, LIDAR and/or radar to detect the bicycle. Bicycles have a predetermined shape and outline which is recognized by the sensors. The bicycle and the vehicle are used to perform different scenarios, and the performance of the autonomous braking system is then evaluated.

Evaluation of an emergency braking system using an actual bicycle may be problematic. Further, the pedaling motion of a bicyclist may affect the performance of some optical sensors and radar systems.

Accordingly, a need exists for an apparatus configured to have a radar cross section pattern similar to that of a bicyclist, to have a shape and size similar to that of a bicyclist, withstand a load from a test vehicle, and minimize damage to the test vehicle. It is further desirable to have an apparatus configured to mimic the pedaling motion of a bicyclist so as to evaluate the performance of the optical sensor and radar of a System.

SUMMARY

In one embodiment, an apparatus for repetitive use in automotive testing includes a body having the dimensions of a human body. The body includes a torso and a pair of legs. Each leg includes an upper portion and a lower portion pivotably connected to each other. The apparatus further includes an upper drive and a lower drive. The upper drive pivotably drives the upper portion of each of the legs about a first pivot point, the first pivot point is disposed on a bottom portion of the torso. The lower drive pivotably drives the upper portion of the leg with respect to the lower portion of the leg. The upper and lower drive work in concert to articulate the upper and lower portions of the leg to replicate a pedaling motion of a human bicyclist.

In another embodiment, an apparatus for repetitive use in automotive testing includes a bicycle frame detachable mounted to a sled. The apparatus further includes a body having the dimensions of a human body. The body includes a torso and a pair of legs. Each leg includes an upper portion and a lower portion pivotably connected to each other. The apparatus further includes an upper drive and a lower drive. The upper drive pivotably drives the upper portion of each of the legs about a first pivot point, the first pivot point is disposed on a bottom portion of the torso. The lower drive pivotably drives the upper portion of the leg with respect to the lower portion of the leg. The upper and lower drive work in concert to articulate the upper and lower portions of the leg to replicate a pedaling motion of a human bicyclist. The torso includes a detachable member configured to detachably engage the bicycle frame so as to disengage from the bicycle frame upon experiencing a predetermined load. The apparatus dissipates a load from a test vehicle into kinetic energy as the body is decoupled form the bicycle frame. Accordingly, the apparatus may be used repeatedly in automotive testing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 is an isolated view showing upper and lower drives of the apparatus shown in FIG. 1 according to one or more embodiments shown and described herein;

FIG. 3a is a view showing the motion of the feet of the apparatus shown in FIG. 1 according to one or more embodiments shown and described herein;

FIG. 3b is a view showing the feet of the apparatus shown in FIG. 3a advanced;

DETAILED DESCRIPTION

Reference will now be made in detail to embodiments of apparatus for use in automotive testing. The apparatus is configured to provide a signal to sensors replicating the motion of a bicyclist so as to accurately evaluate an active control system of an automotive vehicle such as an automatic emergency braking system. The apparatus is further configured to withstand a load from an automotive test vehicle by transforming the load into kinetic energy.

In embodiments, the apparatus has a body formed of a padding dimensioned to assume the shape of a predetermined sized human bicyclist. The body includes a torso and a pair of legs. The apparatus further includes an upper and lower drive. The upper and lower drives are configured to articulate the legs so as to resemble the pedaling of a bicycle. In particular, the upper drive is configured to move the upper portion of the legs about a first axis so as to mimic articulation of a human thigh about the hip. The lower drive is configured to bend the legs about the mid-portion so as to mimic the articulation of the calf and thigh of a human about the knee. Accordingly, the apparatus provides a proper signature seen by a sensor of an active control system so as to properly evaluate the effectiveness of the active control system.

Further, embodiments also provide for an apparatus having a body detachably mounted to a bicycle frame so as to transfer the load of a vehicle impact into kinetic energy. The transformation of the load helps preserve the apparatus for repetitive use in automotive testing.

Various embodiments of an apparatus for evaluating the effectiveness of a System of a vehicle in automotive testing and the operation of the apparatus for evaluating the effectiveness of a System of a vehicle in automotive testing will be described in more detail herein.

Figure 1:
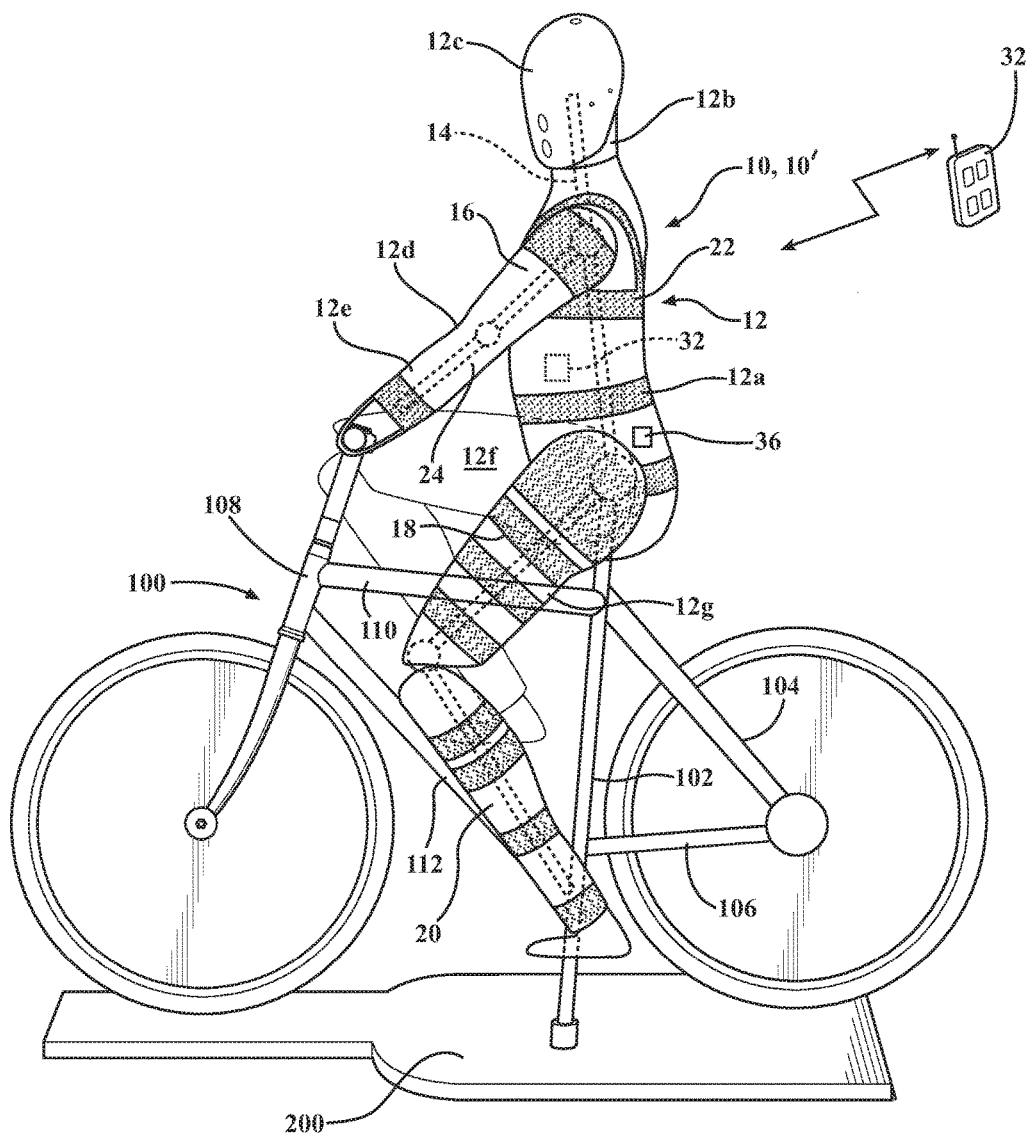
FIG. 1 depicts an example apparatus for use in automobile testing according to one or more embodiments shown and described herein.

FIG. 1, depicts an example of an apparatus for use in automotive testing, such as the testing of an active control system such as an emergency braking system of an automotive vehicle. The apparatus 10 includes a body 12 dimensioned to assume the shape of a human bicyclist. The body 12 includes a plurality of elongated supports 14 (shown in dashed lines) each generally encapsulated in a padding 16, forming a torso 12a, a neck 12b, a head 12c, a pair of arms 12d, 12e and a pair of legs 12f, 12g. The legs 12f, 12g include an upper portion 18 respectively replicating the thigh of a human and a lower portion 20 replicating the calf of a human. The apparatus 10 may further include a skin 22 mounted over of the body 12 so as to provide the apparatus 10 with a radar cross section of a real human.

It should be appreciated that the size of the body 12 may vary based upon the desired test conditions. For instance a body 12 may be used to replicate children, a body 12 with a rounded torso may be used to replicate obese population. Accordingly, it should be appreciated that the dimensions shown in the Figures are provided for illustrative purposes and are not limiting the scope of the appended claims.

The arms 12d, 12e may include an arm joint 24 disposed about the mid portion of each arm 12d, 12e so as to articulate an upper portion of an arm 12d/12e with respect to the lower portion 12d/12e. The arm joint 24 may be configured to fix the upper portion of the arm 12d, 12e to the lower portion of the arm 12d/12e. Any arm joint currently known and used in the art may be adapted for use herein, illustratively including arm joints used in commercial mannequins. Accordingly, the arms 12d, 12e may be articulated so as to assume different torso positions with respect to the surrogate bicycle. Likewise, the torso 12a and the head 12c may be articulated so as to assume a desired riding position.

FIG. 2 depicts an embodiment of an upper drive 28 and a lower drive 30. The upper drive 28 operatively connects the upper portion 18 of the legs 12f, 12g to a lower portion 20 of the torso 12a (as shown in FIG. 1). The upper drive 28 is configured to pivot the upper portion 18 of legs 12f, 12g about the torso 12a in a similar manner as a human thigh is articulated when pedaling a bicycle.

The upper drive 28 is illustratively shown as having a first upper driving unit 28a and a second upper driving unit 28b. The first and second upper driving units 28a, 28b are disposed on opposite sides of the lower portion 20 of the torso 12a. The first upper driving unit 28a and the second driving unit 28b include a respective first and second upper drive shafts 28c, 28d. The first and second upper driving units 28a, 28b rotate respective first and second upper drive shafts 28c, 28d. The first and second upper driving units 28a, 28b may be an electric motor configured to rotate respective first and second upper drive shafts 28c, 28d.

Referring again to FIG. 1, the apparatus 10 may include a programmable control unit 32 configured to control the upper and lower drives 28, 30. In some embodiments, the programmable control unit 32 may be further configured to receive a command signal from a remote controller 34. The remote controller 34 includes inputs for commanding the articulation of the legs 12f, 12g. The apparatus 10 further includes a battery 36 for powering the upper and lower drives 28, 30. The programmable control unit 32 and the battery 36 are disposed within the padding 16 so as to be protected upon impact from a test vehicle. Alternatively, the apparatus may be controlled by a computing device such as a personal computer, a tablet, a smart phone, or the like. Accordingly, the apparatus 10 may be controlled remotely so as to facilitate a testing condition.

FIGS. 3a and 3b illustratively shows the pair of legs 12f, 12g articulating in a manner mimicking a pedaling motion. An explanation of the articulation of the legs 12f, 12g is provided with reference to FIGS. 2, 3a and 3b. The first and second upper driving units 28a, 28b work in concert to pivot the upper portion 18 of each of the pair of legs 12f, 12g between a first upper position ("1UP") and a second upper position ("2UP"). The first upper driving unit 28a pivots the upper portion 18 of leg 12f about a first upper pivot point ("1UPP") a first degree $F_1$ so as to move leg 12f between the first upper position 1UP and the second upper position 2UP. The first upper pivot point 1UPP may be defined by the first upper drive shaft 28c. Similarly, the second driving unit 28b pivots the portion of upper portion 18 of leg 12g about a second upper pivot ("2UPP") a second degree $F_2$ so as to move leg 12g between the first upper position 1UP and the second upper position 2UP. The first degree $F_1$ is the same as the second degree $F_2$. The second upper pivot point 2UPP may be defined by the second upper drive shaft 28d.

Figure 4:
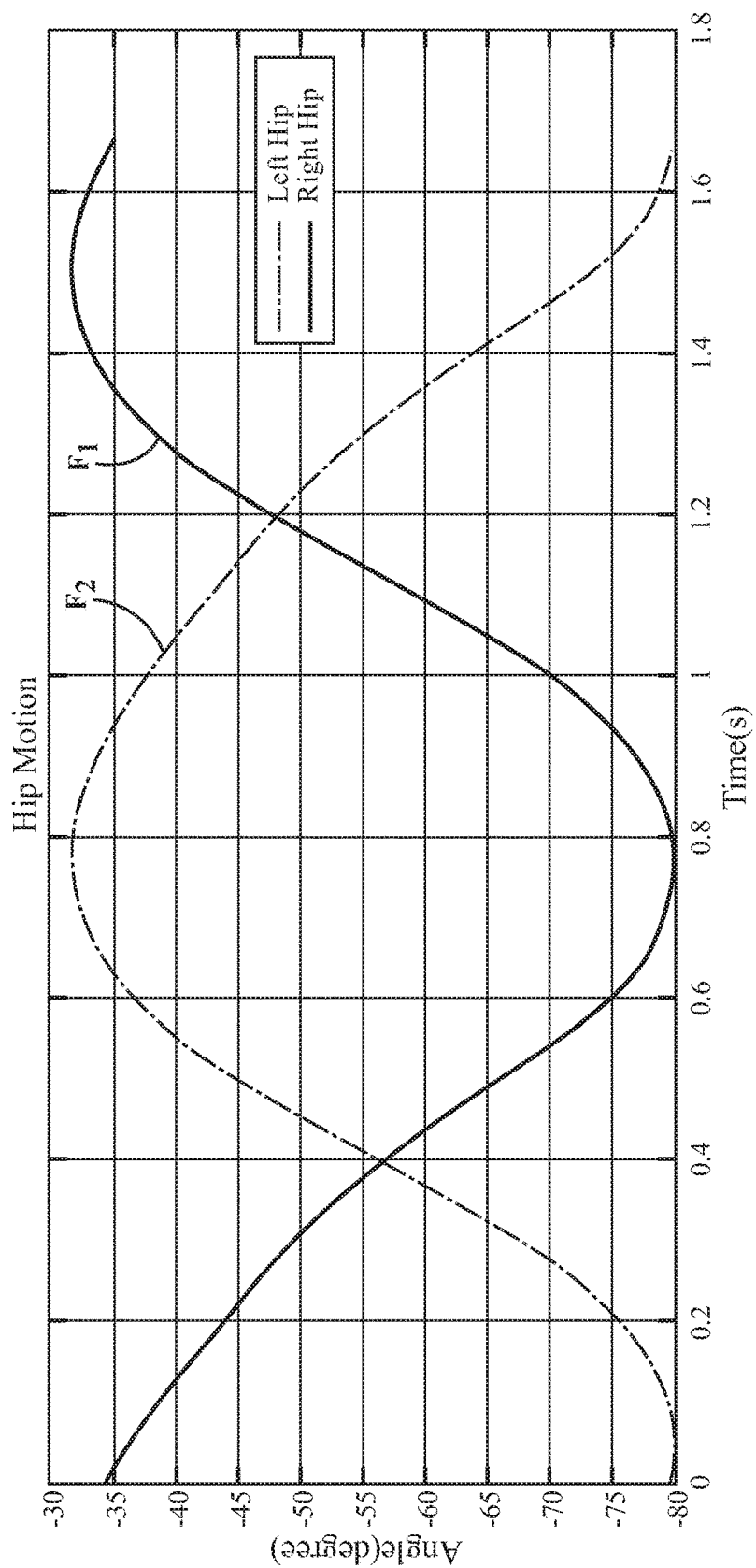
FIG. 4 is a graph showing the hip motion of the apparatus shown in FIG. 1 according to one or more embodiments shown and described herein.

FIG. 4 is a graph depicting the rotation of the upper portion 18 of legs 12f, 12g about respective first and second upper pivot points 1UPP, 2UPP. FIG. 4 shows the upper portion 18 of leg 12f and 12g being pivoted independently of each other. The first and second degrees $F_1$ and $F_2$ is generally fifty degrees (50). The legs 12f, 12g are pivoted by the same phase separated by a half wave length, wherein one leg 12f/12g reaches the first upper position 1UP when the other leg 12g/12f is in the second upper position 2UP.

The first and second upper driving units 28a, 28b are configured to operate independently of each other. FIG. 3a shows the upper portion 18 of leg 12f in the first upper position 1UP and the upper portion 18 of leg 12g in the second upper position 2UP. FIG. 3b shows the upper portion 18 of leg 12f in the second upper position 2UP and the upper portion 18 of leg 12g in the first upper position 1UP. The legs 12f, 12g alternate between the first and second upper positions 1UP, 2UP by rotation about respective 1UPP and 2UPP in the same manner a user's thighs move when pedaling a bicycle.

FIG. 2 also depicts an embodiment of the lower drive 30. The lower drive 30 operates in concert with the upper drive 28 to actuate the legs 12f and 12g in a manner mimicking the pedaling of a bicyclist. The lower drive 30 is operatively connecting the upper portion 18 of the legs 12f, 12g to the lower portion 20 of the legs 12f, 12g. The lower drive is configured to bend the respective lower portion 20 of the legs 12*f*, 12*g* with respect to the upper portion 18 of the legs 12*f*, 12*g*, in the same manner a knee allows the thigh bend with respect to the calf.

The lower drive 30 includes a first lower driving unit 30*a* and a second lower driving unit 30*b*. The first lower driving unit 30*a* and the second lower driving unit 30*b* mechanically connects the upper portion 18 each leg 12*f*, 12*g* to a respective lower portion 20 a respective leg 12*f*, 12*g*. The first and second lower driving unit 30*a*, 30*b* may be an electric motor. The first and second lower driving unit 30*a*, 30*b* each include a respective first and second lower drive shafts 30*c*, 30*d*.

The lower portion 20 of leg 12*f*, 12*g* is pivotable with respect to a corresponding upper portion 18 a first lower position ("1LP") and a second lower position ("2LP"). The first lower driving unit 30*a* pivots the lower portion 20 the leg 12*f* with respect to a respective upper portion 18 about the first lower pivot point ("1LPP") a third degree $F_3$ so as to move leg 12*f* between the first lower position 1LP and the second lower position 2LP. Likewise, the second driving unit 30*b* pivots the lower portion 20 of leg 12*g* with respect to a respective upper portion 18 about a second lower pivot point ("2LPP") a fourth degree $F_4$ so as to move leg 12*g* between the first and second lower positions.

FIGS. 3*a* and 3*b* depict the lower driving units 30*a*, 30*b* moving the lower portion 20 of legs 12*f*, 12*g* with respect to the upper portion 18. FIG. 3*a* shows the lower portion of leg 12*f* in the first lower position 1LP as the lower portion of leg 12*g* is in the second lower position 2LP. FIG. 3*b* shows the lower portion of leg 12*f* in the second lower position 2LP as the lower portion of leg 12*g* is in the first lower position 1LP. The upper and lower portions 18, 20 are pivoted about respective first and second lower pivot points 1LPP, 2LPP when moving between the first and second lower positions 1LP, 2LP.

FIGS. 3*a* and 3*b* also show the feet 12*h* of the legs 12*f*, 12*g* constrained in their movements between the first upper position, first lower position and the second upper position and second lower position along an orbital path. In particular, the orbital path is generally circular, thus when provided with a radar reflective skin, the movement of the legs 12*f*, 12*g* provide a radar signal of a bicyclist pedaling a bicycle. Accordingly, it should be appreciated that the apparatus is configured to pivot the upper portion 18 of the legs 12*f*, 12*g* with respect to the lower portion 20 of the leg 12*f*, 12*g* in a similar manner as a human leg is articulated when pedaling a bicycle.

Figure 5:
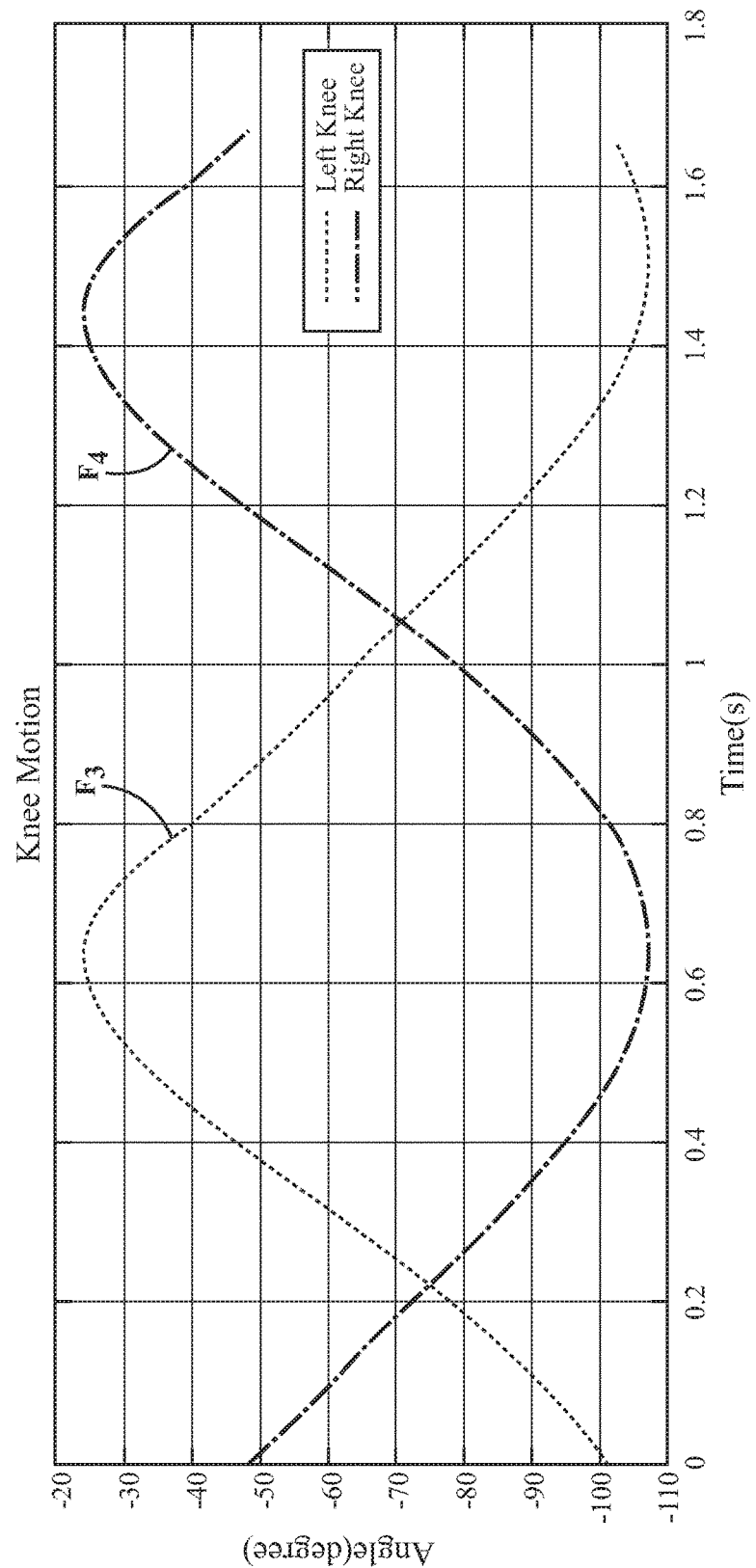
FIG. 5 is a graph showing the knee motion of the apparatus shown in FIG. 1 according to one or more embodiments shown and described herein.

FIG. 5 is a graph depicting the rotation of the lower portion 20 of legs 12*f*, 12*g* about respective first and second lower pivot points 1LPP, 2LPP. FIG. 5 shows the lower portion 20 of leg 12*f* and 12*g* being pivoted independently of each other. The third and fourth degrees $F_3$ and $F_4$ is generally seventy-five degrees (75). The legs 12*f*, 12*g* are pivoted by the same phase separated by a half wave length, wherein one leg 12*f*/12*g* reaches the first lower position 1LP when the other leg 12*g*/12*f* is in the second lower position 2LP.

Figure 6:
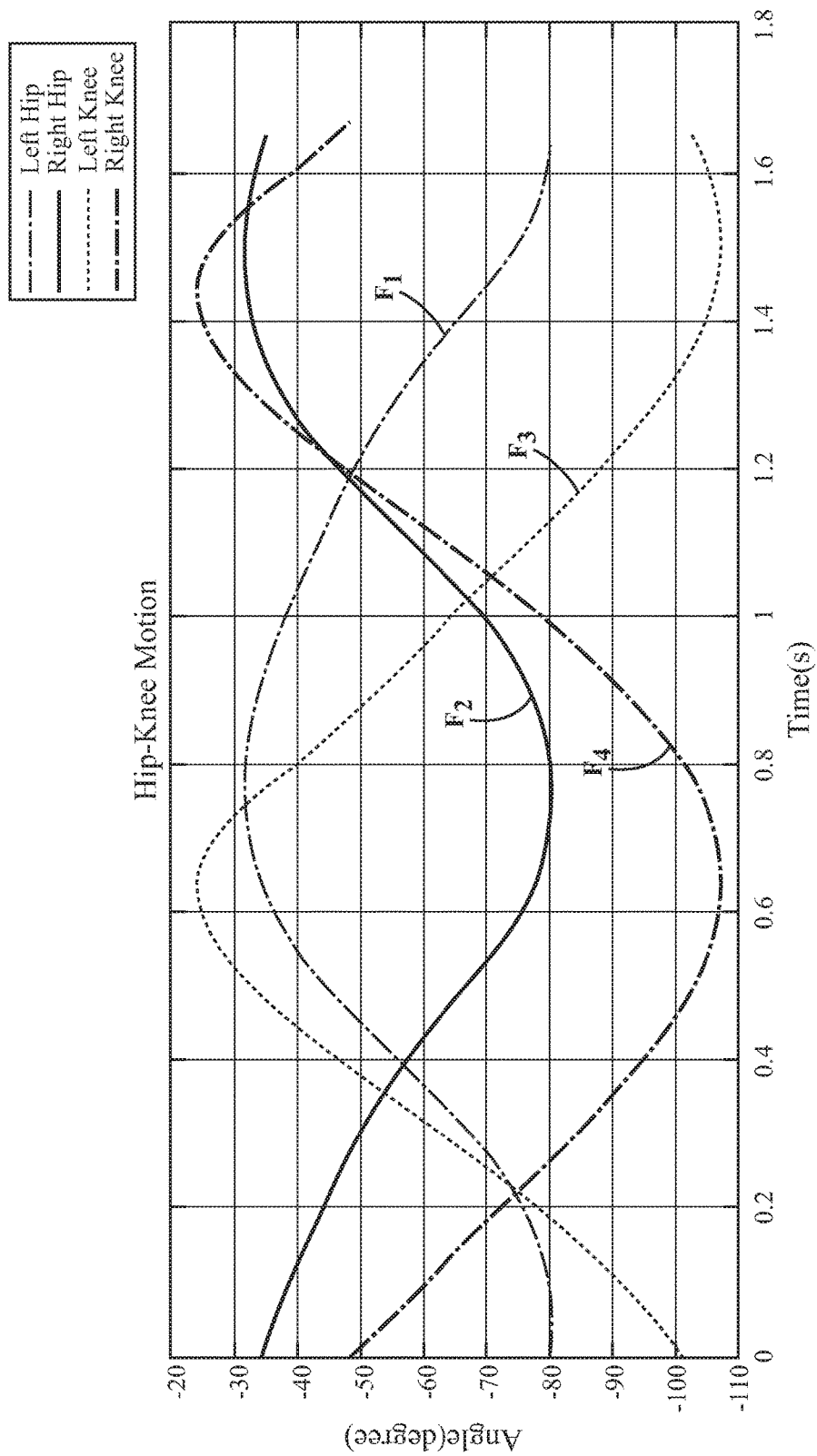
FIG. 6 is a graph showing the hip motion and the knee motion of the apparatus shown in FIG. 1 according to one or more embodiments shown and described herein.

FIG. 6 is a graph depicting the rotation of the lower portion 20 and the upper portion of the 12*f*, 12*g*. The graph is illustrative of the pedaling motion of a bicyclist in terms of the degree of movement of the legs 12*f*, 12*g* and is not limiting. For instance, the graph shows the movement of the knees having a frequency of 1.2 seconds, but the frequency may be increased or decreased to mimic a desired speed of travel of the bicyclist. FIG. 6 shows how the legs 12*f*, 12*g* are articulated independently, but work in concert with each other so as to generate a motion replicating the pedaling of a bicycle. With reference also to FIGS. 3*a* and 3*b*, the legs are articulated so as to move feet 12*h* along a generally circular orbit in a similar manner as the legs of a human cyclist pedal a bicycle. However, unlike a human bicyclist operating an actual bicycle, there is no need for an actual pedal as such a part may be damaged by the test vehicle.

In operation, the apparatus 10 may be mounted to the base 200. The base 200 may be pulled by a drive (not shown) so as to place the apparatus in the course of path of an automotive test vehicle (not shown). The automotive test vehicle may be equipped with an active control system, such as an emergency braking system or a collision avoidance system so as to evaluate the effectiveness of the active control system.

The programmable control unit 32 actuates the upper and lower drives 28, 30. The legs 12*f*, 12*g* are moved so as to replicate the pedaling of a bicyclist. The programmable control unit 32 may be configured to receive a command signal from a remote controller 34. The programmable control unit 32 may actuate the legs 12*f*, 12*g* so as to move the legs 12*f*, 12*g* at different speeds. The legs 12*f*, 12*g* are movable between the first upper position 1UP and the second upper position 2UP as shown in FIGS. 3*a* and 3*b*. In particular, the upper portion 18 of the legs 12*f*, 12*g* pivot about respective first and second upper pivot points 1UPP, 2UPP. Simultaneously, the lower portion 20 of legs 12*f*, 12*g* pivot about respective first and second lower pivot points 1LPP, 2LPP, moving the feet 12*h* along a generally circular orbit.

The active control system includes sensors configured to detect a pedaling motion of a bicyclist. Accordingly, the apparatus 10 is useful in evaluating the effectiveness of the active control system. Namely, the apparatus is useful in evaluating the effectiveness of the sensors. For instance, a sensor that may be used in active control systems may be radar. The radar signals are processed to determine the presence of a bicyclist by comparing the radar cross-section with that of a benchmark for a pedaling bicyclist. As the apparatus provides the motion of a pedaling bicyclist, and may have radar reflective skin, the apparatus provides a radar signal representative of a bicyclist. Thus, the effectiveness of the radar's ability to detect a bicyclist may be evaluated.

In another example of a sensor used for active control systems is a camera. The active control system may include benchmark images of the pedaling motion. A camera processor processes the camera images to detect the presence of a bicyclist. The apparatus 10 is shaped as a human body, and the legs 12*f*, 12*g* moves in the same manner as a pedaling bicyclist. Accordingly, the apparatus 10 is useful in evaluating the effectiveness of the camera in detecting bicyclists.

The user may simply mount the body 12 onto the support beam 102 by pushing the detachable member 50 onto the distal upper end 102*a* of the support beam 102. Thus, the apparatus 10' is ready for subsequent testing. Accordingly, the apparatus 10' is configured for repetitive use in automotive testing. Further, the apparatus 10' is simple in construction so as to decrease preparation time for automotive testing.

Figure 7:
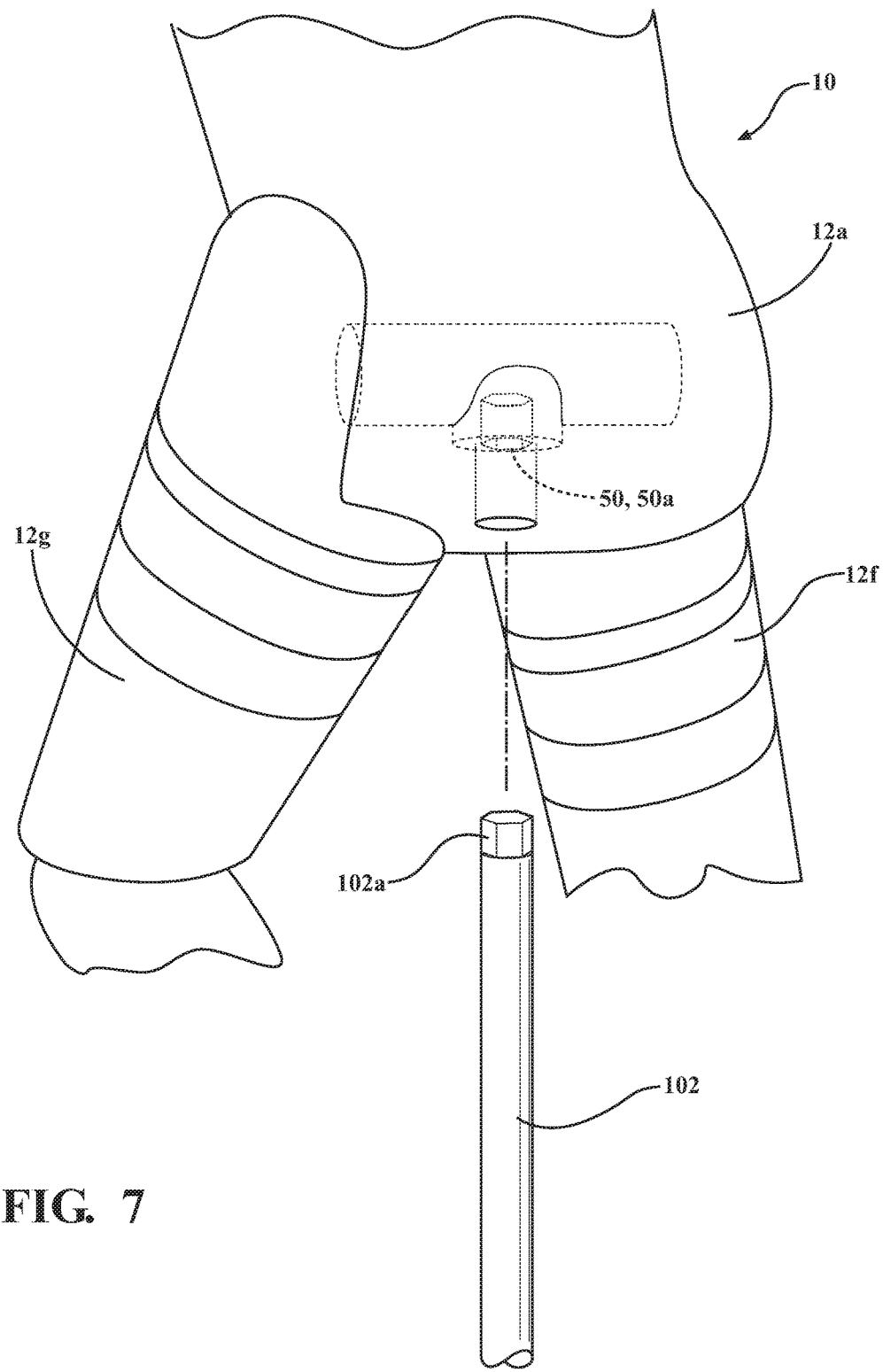
FIG. 7 is an isolated view showing a detachable member according to one or more embodiments shown and described herein.

With reference to FIGS. 1 and 7, another example apparatus 10' for repetitive use in automotive testing is provided. The apparatus 10' may be used in an automotive testing wherein a test vehicle impacts the apparatus 10. The apparatus 10 is configured to absorb multiple loads by the test vehicle. The apparatus 10 includes a bicycle frame 100 mounted to a base 200. The base 200 may be configured to be pulled by drive (not shown) or may be stationary as shown in FIG. 1.

In the apparatus 10' shown in FIG. 7, the body 12' is configured to detach from the bicycle frame 100. The apparatus 10' includes a detachable member 50 disposed on the torso 12a. The detachable member 50 is configured to detachably engage the bicycle frame 100 so as to disengage from the bicycle frame 100 upon experiencing a predetermined load. Accordingly, the apparatus 10 dissipates the load from a test vehicle into kinetic energy as the body is decoupled form the bicycle frame. The conversion of impact into kinetic energy reduces damage to the structure of the bicycle frame and helps maintain the apparatus in condition for repeated use in automotive testing.

The bicycle frame 100 may be formed of a plurality of beams 102, 104, 106, 108, 110, 112. One of the beams is a seat support beam 102 having a distal upper end 102a. The upper distal end 102a of the support beam 102 may include a bolt 114. The detachable member 50 may be dimensioned to detachably engage the nut. For example, the detachable member 50 may be a socket 50a configured to engage the bolt 114.

In operation, the apparatus 10' may be mounted to the base 200. The base 200 may be pulled by a drive (not shown) so as to place the apparatus in the course of path of an automotive test vehicle (not shown). The automotive test vehicle may be equipped with an active control system, such as an emergency braking system or a collision avoidance system so as to evaluate the effectiveness of the active control system. Alternatively, the evaluation may be directed towards studying impact, wherein the automotive test vehicle and the apparatus 10' are intended to collide with each other. In the event of a collision between the automotive test vehicle and the apparatus 10', the body 12 is displaced from the base 200. In particular, detachable member 50 detaches from the distal upper end 102a of the support beam 102, transforming the impact into kinetic energy and preserving the apparatus 10' for subsequent testing.

The user may simply mount the body 12 onto the support beam 102 by pushing the detachable member 50 onto the distal upper end 102a of the support beam 102. Thus, the apparatus 10' is ready for subsequent testing. Accordingly, the apparatus 10' is configured for repetitive use in automotive testing. Further, the apparatus 10' is simple in construction so as to decrease preparation time for automotive testing.

It should now be understood that embodiments described herein are directed to an apparatus configured to provide a signal to sensors replicating the motion of a bicyclist so as to accurately evaluate an active control system of an automotive vehicle such as an automatic emergency braking system. The apparatus is further configured to withstand a load from an automotive test vehicle by transforming the load into kinetic energy so as to be in condition for repetitive use in automotive testing.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus for repetitive use in automotive testing, the apparatus comprising:
   a bicycle frame;
   a body mounted to the bicycle frame, the body comprising a torso and a pair of legs, each leg of the pair of legs including an upper portion and a lower portion pivotably connected to each other;
   an upper drive, wherein the upper drive pivotably drives the upper portion of each of the pair of legs about a first pivot point, the first pivot point is disposed on a bottom portion of the torso; and
   a lower drive, wherein the lower drive pivotably drives the upper portion of a respective leg of the pair of legs with respect to a corresponding lower portion of the leg of the pair of legs, the upper drive and the lower drive working in concert to articulate the upper and lower portions of the leg to so as to move a distal end of each of the pair of legs along a circular orbit so as to replicate a pedaling motion.

2. The apparatus as set forth in claim 1, wherein the body further comprises a neck, a head, and a pair of arms.

3. The apparatus as set forth in claim 2, wherein the body further comprises a plurality of elongated supports, each of the plurality of elongated supports encapsulated by a padding so as to respectively form the torso, the pair of legs, the neck, the head, and the pair of arms.

4. The apparatus as set forth in claim 1, further including a skin mounted over the body, the skin and the body having a radar cross section of a human body.

5. The apparatus as set forth in claim 1, wherein:
   the upper drive includes a first upper driving unit and a second upper driving unit, the first upper driving unit and the second upper driving unit each having a first portion and a second portion; and
   the first portion of each of the first upper driving unit and the second upper driving unit is pivotably attached about the first pivot point, the second portion of each of the first upper driving unit and the second upper driving unit are pivotably coupled to the upper portion of a respective leg of the pair of legs.

6. The apparatus as set forth in claim 5, wherein:
   the upper portion of each of the pair of legs is pivotable between a first upper position and a second upper position, the first upper driving unit pivots the upper portion of one of the pair of legs about a first upper pivot point a first degree so as to move between the first upper position and the second upper position, the second driving unit pivots the portion of upper portion of the other of the pair of legs about a second upper pivot a second degree so as to move between the first upper position and the second upper position, wherein the first degree is the same as the second degree and wherein one of the upper portion of the pair of legs moves to the first upper position as the other of the upper portion of the pair of legs moves to the second upper position so as to alternate between the first and second upper positions.

7. The apparatus as set forth in claim 1, wherein the lower drive includes a first lower driving unit and a second lower driving unit, the first lower driving unit mechanically connecting the upper portion of one leg of the pair of legs to a respective lower portion of the one leg of the pair of legs, the second lower driving unit mechanically connecting the upper portion of the other leg of the pair of legs to a respective lower portion of the other leg of the pair of legs.

8. The apparatus as set forth in claim 7, wherein:
the lower portion of each of the pair of legs is pivotable with respect to a corresponding upper portion of the pair of legs between a first lower position and a second lower position;
the first lower driving unit pivots the lower portion of the one of the pair of legs with respect to a respective upper portion about a first lower pivot point a third degree so as to move between the first lower position and the second lower position;
the second driving unit pivots the lower portion of the other of the pair of legs with respect to a respective upper portion about a second lower pivot point a fourth degree so as to move between the first and second lower positions; and
one of the lower portions of the pair of legs moves to the first lower position as the other of the lower portions of the pair of legs moves to the second lower position.

9. The apparatus as set forth in claim 1, further including a programmable control unit, the programmable control unit in communication with the both the upper drive and the lower drive, the programmable control unit actuating the upper drive and the lower drive so as to generate a pedaling motion of the pair of legs.

10. The apparatus as set forth in claim 9, wherein the programmable control unit actuates the upper drive and the lower drive so as to move a distal end of respective lower portions of each of the pair of legs along the circular orbital path.

11. An apparatus for repetitive use in automotive testing wherein a test vehicle impacts the apparatus, generating a load on the apparatus, the apparatus comprising:
a bicycle frame mounted to a sled;
a body comprising a torso and a pair of legs, each leg of the pair of legs includes an upper portion and a lower portion pivotably connected to each other; and
an upper drive, the upper drive pivotably drives the upper portion of each of the pair of legs about a first pivot point, the first pivot point is disposed on a bottom portion of the torso;
a lower drive, the lower drive pivotably drives the upper portion of a respective leg of the pair of legs with respect to a corresponding lower portion of the leg of the pair of legs, the upper drive and the lower drive working in concert to articulate the upper and lower portions of the leg to replicate a pedaling motion; and
a detachable member fixedly mounted to the torso and detachable mounted to the bicycle frame, the detachable member configured to disengage from the bicycle frame upon experiencing a predetermined load, the apparatus dissipates the load from a test vehicle into kinetic energy as the body is decoupled form the bicycle frame, accordingly, the apparatus may be used repeatedly in automotive testing.

12. The apparatus as set forth in claim 11, wherein the bicycle frame includes a plurality of beams, one of the plurality of beams being a seat support beam having a distal upper end, the detachable member detachably engaged with the distal upper end of the seat support beam.

13. The apparatus as set forth in claim 12, further including a bolt mounted to the distal upper end of the seat support beam, and wherein the detachable member is a socket configured to detachably engage the bolt.

14. The apparatus as set forth in claim 11, further including a skin mounted over the body, the skin having a radar cross section of a human body.

15. The apparatus as set forth in claim 11, wherein the upper drive further includes:
a first upper driving unit;
and a second upper driving unit, wherein the first upper driving unit and the second upper driving unit each having a first portion and a second portion;
wherein the first portion of each of the first upper driving unit and the second upper driving unit is pivotably attached about the first pivot point, the second portion of each of the first upper driving unit and second upper driving unit is pivotably coupled to the upper portion of a respective leg of the pair of legs.

16. The apparatus as set forth in claim 15, wherein:
the upper portion of each of the pair of legs is pivotable between a first upper position and a second upper position, the first upper driving unit pivots the upper portion of one of the pair of legs about a first upper pivot point a first degree so as to move between the first upper position and the second upper position, the second driving unit pivots the portion of upper portion of the other of the pair of legs about a second upper pivot a second degree so as to move between the first upper position and the second upper position; and
wherein the first degree is the same as the second degree and wherein one of the upper portion of the pair of legs moves to the first upper position as the other of the upper portion of the pair of legs moves to the second upper position so as to alternate between the first and second upper positions.

17. The apparatus as set forth in claim 11, wherein the lower drive includes a first lower driving unit and a second lower driving unit, the first lower driving unit mechanically connecting the upper portion of one of the pair of legs to a respective lower portion of one of the pair of legs, the second lower driving unit mechanically connecting the upper portion of the other of the pair of legs to a respective lower portion of the other of the pair of legs.

18. The apparatus as set forth in claim 17, wherein the lower portion of each of the pair of legs is pivotable with respect to a corresponding upper portion of the pair of legs between a first lower position and a second lower position, and wherein the first lower driving unit pivots the lower portion of the one of the pair of legs with respect to a respective upper portion about a first lower pivot point a third degree so as to move between the first lower position and the second lower position, the second driving unit pivots the lower portion of the other of the pair of legs with respect to a respective upper portion about a second lower pivot point a fourth degree so as to move between the first and second lower positions, and wherein one of the lower portions of the pair of legs moves to the first lower position as the other of the lower portions of the pair of legs moves to the second lower position.

19. The apparatus as set forth in claim 11, further including a programmable control unit, the programmable control unit in communication with the both the upper drive and the lower drive, the programmable control unit actuating the upper drive and the lower drive so as to generate a pedaling motion.

20. The apparatus as set forth in claim 19, wherein the programmable control unit actuates the upper drive and the lower drive so as to move a distal end of respective lower portions of each of the pair of legs along a circular orbital path.

* * * * *